J. KONIGSBERG.
SHOCK ABSORBER.
APPLICATION FILED MAY 14, 1921.
1,423,946.
Patented July 25, 1922.
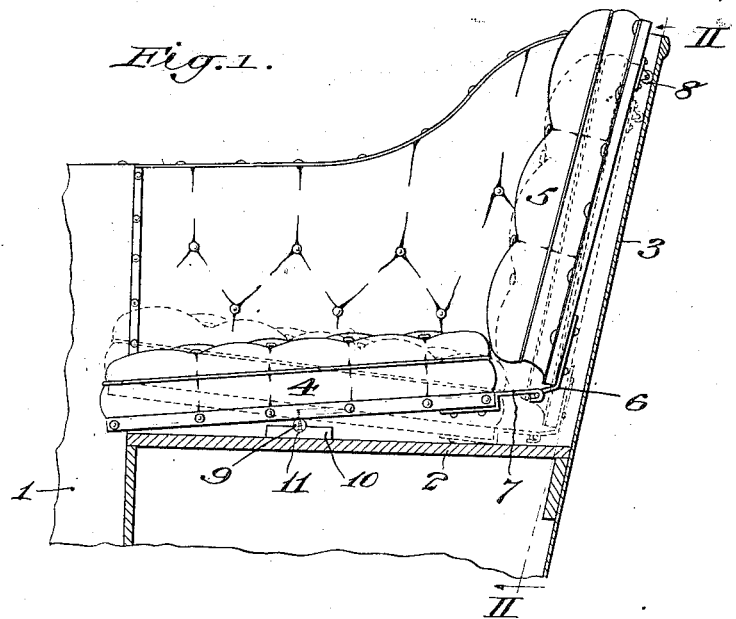
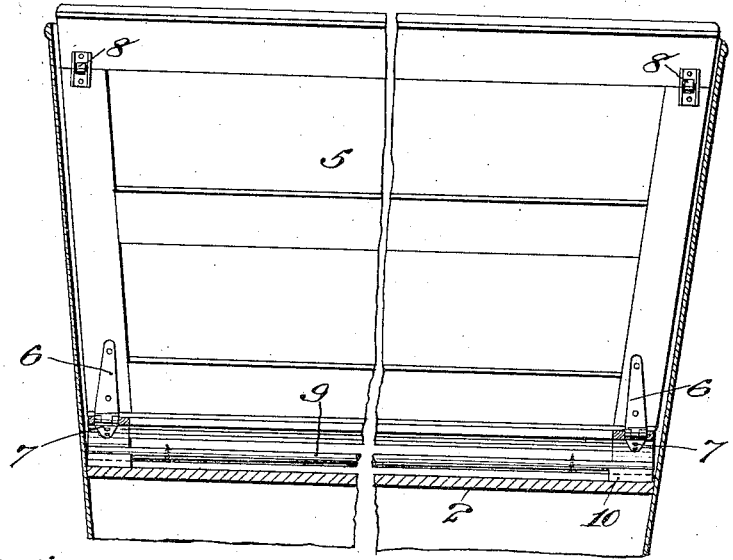
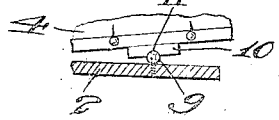
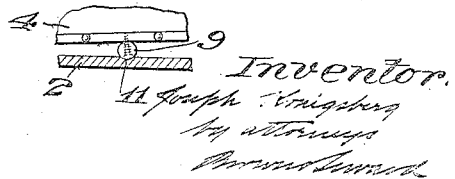

UNITED STATES PATENT OFFICE.

JOSEPH KONIGSBERG, OF NEW YORK, N. Y., ASSIGNOR TO LENA KONIGSBERG, OF NEW YORK, N. Y.

SHOCK ABSORBER.

1,423,946.    Specification of Letters Patent.    Patented July 25, 1922.

Application filed May 14, 1921. Serial No. 469,557.

*To all whom it may concern:*

Be it known that I, JOSEPH KONIGSBERG, a citizen of the United States, and resident of the borough of Bronx, in the city and State of New York, have invented a new and useful Improvement in Shock Absorbers, of which the following is a specification.

The object of my invention is to provide an automobile with means located between the seat and its support for effectually absorbing the shocks due to the operation of the automobile over rough surfaces, said means being extremely simple in construction, inexpensive to manufacture, readily attached, requiring no reconstruction or change of the seat and its support, and interfering in no way with the ready removal and replacement of the seat.

A further object of my invention is to provide means whereby the back is connected to the seat so as to move therewith.

My shock absorbing means comprises a device which will permit a limited rocking movement of the seat and its support longitudinally of the automobile, said rocking movement being preferably free.

Practical embodiments of my invention are represented in the accompanying drawings, in which, Fig. 1 represents in longitudinal section so much of an automobile body as will give a clear understanding of my invention.

Fig. 2 represents a transverse vertical section taken in the plane of the line II—II of Fig. 1.

Fig. 3 represents a detail longitudinal section illustrating a modified form of shock absorbing means.

Fig. 4 represents a detail longitudinal section illustrating a second modified form of shock absorbing means.

The automobile body is denoted by 1, the seat support by 2 and the back support by 3.

The seat is denoted by 4 and the back by 5. The back is connected to the seat by hinges having pairs of separable members 6 and 7. Anti-friction means is interposed between the back 5 and back support 3 for permitting the back to slide freely along said support. This means in the present instance is shown as anti-friction rollers 8 secured to the back near its top.

The shock absorbing means which is located between the seat and its support is illustrated in Figs. 1 and 2 as a round crossbar 9 fastened to the bottom of the seat, and a crossbar 10 fastened to the seat support, said crossbar 10 having a semi-circular recess 11 within which the crossbar 9 is seated. This arrangement permits the free rocking movement of the seat longitudinally of the automobile, said rocking movement being limited by the engagement of the bottom of the seat at its front or back with the seat support.

In the form illustrated in Fig. 3, the round crossbar 9 is fastened to the seat support and the crossbar 10 is fastened to the bottom of the seat, thus reversing the parts from that shown in Figs. 1 and 2.

In the embodiment illustrated in Fig. 4, the round crossbar 9 is secured to the bottom of the seat as in Figs. 1 and 2, but the crossbar 10 is eliminated and the transverse recess 11 within which the round crossbar 9 is seated, is formed in the top of the seat support itself.

In all of these forms it will be seen that the seat has an extended bearing on its seat support.

Where the back has been detached from the seat, it has been found that not only is the free action of the seat impeded by the frictional engagement of the back of the occupant with the seat back, but also that the said frictional engagement causes undue wear on the clothes of the occupant, and there is also a tendency of the clothes to become pinched between the seat and the back. All of these features are eliminated, whereby as the seat is located freely, the back is reciprocated up and down along its support.

In operation; as the automobile travels over rough surfaces, the shocks will be absorbed by the rocking of the seat back and forth and any tendency to throw the occupant off the seat is entirely eliminated. The device is so constructed that the seat and back may be readily removed from the automobile and so that the back may be readily separated from the seat.

It is evident that various changes may be resorted to in the construction, form and arrangement of the several parts without departing from the spirit and scope of my invention; hence I do not wish to limit myself to the particular embodiments herein shown and described, but

What I claim is:—

1. In an automobile, fixed seat and back supports, a seat, a rocking connection between the bottom of the seat and the top of the support spacing the seat from the support, the engagement of front and back portions of the bottom of the seat with its support serving to limit the rocking movement of the seat, a back connected at its bottom to the back of the seat, and an anti-friction connection between the top of the back and its support whereby a combined rocking and vertically reciprocating movement is imparted to the back by the rocking of the seat.

2. In an automobile, fixed seat and back supports, a seat, a back connected at its bottom to the back of the seat by hinges having pairs of separable members, rollers secured to the back at its top forming anti-friction means between the back and its support, a crossbar and its recess forming a rocking connection between the bottom of the seat and the top of the support and spacing the seat from the support whereby the rocking movement of the seat is limited by the engagement of front and back portions of the bottom of the seat with its support, the rocking movement of the seat imparting a combined rocking and vertically reciprocating movement to the back.

In testimony, that I claim the foregoing as my invention, I have signed my name this tenth day of May, 1921.

JOSEPH KONIGSBERG.